April 16, 1940.   W. F. GROENE ET AL   2,197,076
CRANKSHAFT BLANK
Original Filed May 24, 1938   2 Sheets-Sheet 1
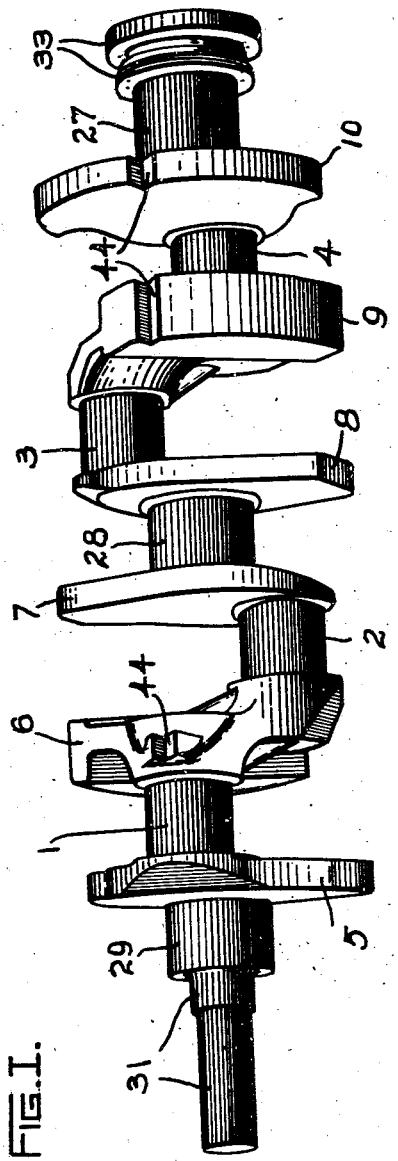
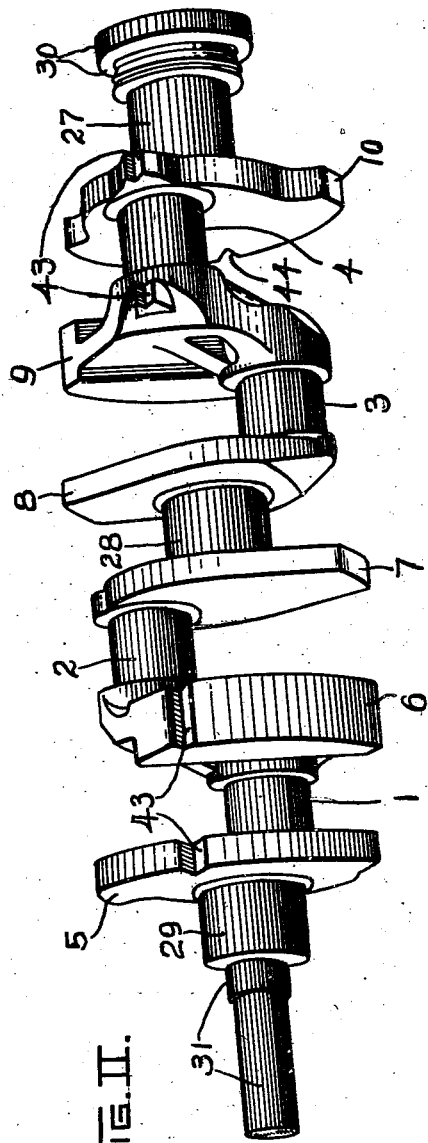
FIG. I.
FIG. II.
WITNESS.
Elmer R. Shipley.
INVENTORS.
WILLIAM F. GROENE
WALTER R. MEYER
BY
ATTORNEY.

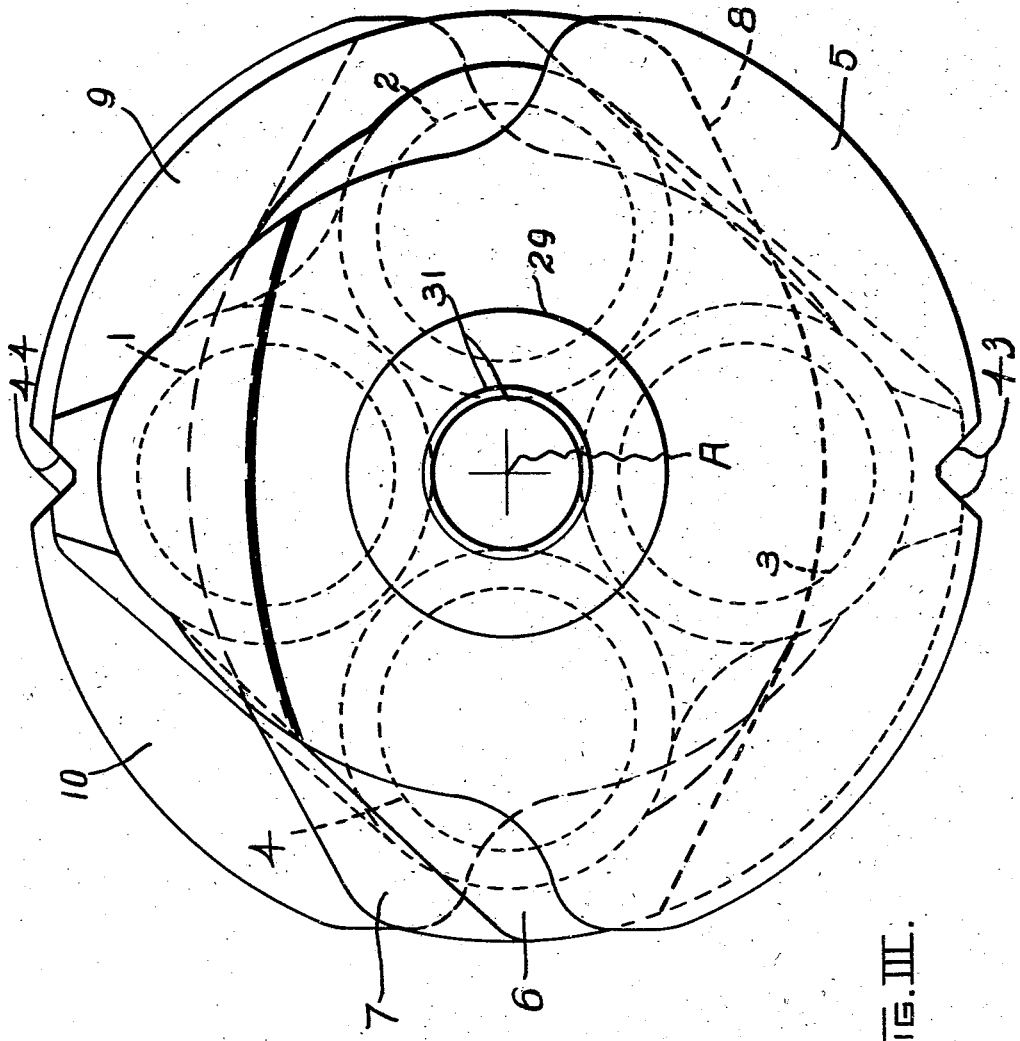
FIG. III.

Patented Apr. 16, 1940

2,197,076

UNITED STATES PATENT OFFICE 2,197,076

CRANKSHAFT BLANK

William F. Groene and Walter R. Meyer, Cincinnati, Ohio, assignors to The R. K. Le Blond Machine Tool Company, Cincinnati, Ohio, a corporation of Delaware Original application May 24, 1938, Serial No. 209,738. Divided and this application November 21, 1938, Serial No. 241,486

3 Claims. (Cl. 29—148)

This application is a division of our copending application, Serial Number 209,738 filed May 24, 1938.

This invention pertains to the preparation of crankshafts for chucking and loading and unloading them in lathes for machining the various bearing portions of said crankshafts. More particularly this invention is related to the preparation of locating areas on a rough crankshaft forging or casting for chucking and to facilitate loading and unloading the crankshaft in the lathe without the use of loading devices of any kind. Specifically this invention consists of providing a unique arrangement of locating areas on the webs of the rough crankshaft forging or casting by which said shaft is loaded and unloaded and chucked for turning in a center drive type of lathe of a character shown in Patent 2,069,107 dated January 26, 1937, in which the crankshaft is chucked and rotated by means of one or more center drive chucks and has its ends supported by centers while cutting tools operate on the various bearing portions of said crankshaft.

Heretofore in lathes of this character it has always been a major difficulty to provide proper means to load and unload the crankshaft into the center drive chucks. One difficulty has been that caused by the tailstock each side of the center drive chucks which prevented the insertion and removal of the work in the center drive chuck on the axis of rotation of the chuck and crankshaft. In order to avoid moving the tailstocks it was found necessary to make the center drive gears relatively large in diameter, in fact so large as to make the machine difficult to operate as these large center drive gears necessitated large housings which projected outwardly to the front of the machine and interfered with the operator's access to the cutting tools and chucking mechanism in the ring gears. In fact these ring gears became so large in instances where loading devices were used that it was practically impossible for the operator to get at certain of the tools, and also difficulty was found in gaining access to the various clamping devices in the ring gear chucks. Another defect of the large ring gears was the difficulty in presenting the tools to the work from such a far removed position when the ring gears were so large as to prevent putting the tool supporting devices sufficiently close to the work piece being machined for proper stability of the tools. This large ring gear construction also presented much greater expense in manufacture, particularly in instances where anti-friction bearings or other highly expensive bearings of large diameter were required. And also in cases where plain bearings were used in conjunction with these large ring gears the surface velocity of the bearing surfaces necessary to properly rotate the crankshaft at cutting speed were so high as to create serious problems of lubrication and wear in the bearings.

Also in the cases where the tailstocks are fixed and relatively large ring gears are utilized it was necessary after moving the crankshaft into the chucking devices to lower it to the chucking members and to raise it again after machining of the crankshaft before it was removed outwardly from the ring gear chuck. This resulted in considerable effort on the part of the operator especially when it was done manually. This also required considerable carefulness of operation on the part of the operator. Where loading devices were used, which loading devices were necessarily of elaborate construction to effect these various movements mechanically, the operator had to carefully actuate them in their proper sequence.

In instances where the tailstocks have been moved in the past the work was invariably loaded manually or by use of the usual cable and hook crane. Such loading and unloading was particularly difficult in instances where more than one center drive chuck was used because of the inability to properly hold the crankshaft when threading it through the chucking devices. The result was that the ring gears had to be made relatively large to permit the crank to be loaded manually without striking the chucking mechanism, and also, the cutting tools had to be withdrawn a relatively great distance from the axis of rotation of the chuck so that they would not be struck by the crankshaft when so loaded. This method obviously was very cumbersome and extremely difficult for the operator to perform and consuming considerable time and energy on his part. Another defect of the above method was that there was no accurate way of guiding the crankshaft into and out of the chucking devices independent of the skill and effort exerted on the part of the operator.

In instances where the former type loading devices were used it was found that considerable effort was required on the part of the operator to roll the various loading cranes with the work hanging thereon into and out of the chucking devices commensurate with the high production required of these machines. With the structure here developed, this former effort was substantially reduced to a minimum while at the same time greatly reducing the amount of mental effort and skill necessary on the part of the operator in actuating the former loading devices in a definite sequential manner and in practically eliminating all costly loading devices.

Furthermore, with these former methods including the former type loading devices, it was impossible to simultaneously load and unload the crankshafts from the chucks. It was necessary first to remove the finished work piece before a rough work piece was again loaded in the chuck whereas with the present method we are now able to simultaneously eject the completed crankshaft from the center drive chuck while loading an unmachined shaft therein. And furthermore in the former devices particularly where one device is utilized for loading and another for unloading of the work, it was necessary for the operator to move from one side of the machine to the other for operating the respective cranes which, of course, consumed time and effort on the part of the operator and cut down the productive output of the machine.

With these former difficulties clearly in mind, it is therefore an object of our invention to provide means for easily loading and unloading crankshafts in a center drive lathe on the axis of rotation of the center drive chucking devices and to provide means for ejecting said crankshafts from the chucking devices with a minimum of effort on the part of the operator.

The chief aim of this invention is to provide suitable locating areas or notches on the work piece or crankshaft adapted to be engaged by the chucking devices of a center drive lathe and to provide in conjunction with said chucking devices means, associated with the tool bars and tailstocks of said lathe, comprising a substantially continuous rail passing through the center drive chucks and past the tailstocks to form a substantially continuous track upon which may be axially slid the crankshaft upon its premachined locating notches for loading into and ejection from said center drive chucking devices, this arrangement being more fully set forth in the above mentioned application Serial No. 209,738.

The problem of properly preparing a rough crankshaft forging or casting to meet the above requirements has indeed been difficult. In the past crankshafts were made from a flat slab of steel and were usually of a type in which the pin bearing and line bearing axes were in the same plane. A good description of such methods to be found in the article in "Machinery," July 1909, pages 873 to 876, inclusive, entitled "The Manufacture of Crank-shafts." Figure 7 of this article clearly illustrates the steps in the process that were formerly used. Obviously the webs of these crankshafts were generally rectangular and had large flat parallel sides. Thus no particular problem was presented in gripping such webs in suitable chucking devices. And furthermore, the problem of rapid turning of all of the line bearings and all of the pin bearings simultaneously had not been present at this time.

With the development of the more general use of multi-throw crankshafts, particularly in the automotive field, this former method became obsolete in favor of the more rapid process of forging, and still later, casting processes. With the latter processes the webs of the crankshaft were formed with very rough and irregular surfaces. And not only this, but also the development of counterweighted webs to provide proper dynamic balance for the high speed motors used today, has resulted in modern-day crankshaft having extremely irregular and odd-shaped webs. Chucking such types of crankshafts presents extreme difficulty particularly when multiple bearing turning, as required today, must be undertaken.

The chucking of these modern-day crankshafts has been substantially solved by arrangements such as shown in Patents 1,843,359, 1,934,976, 2,030,020, and 2,106,501. However, the problem of loading and unloading of the work or crankshaft in such arrangements has been lacking in efficiency commensurate with the high efficiency now obtained by these arrangements in machining of crankshafts. Loading and unloading devices of a character shown in Patents 1,700,721 and 2,069,107 have been used but these involve costly apparatus and require considerable effort on the part of the operator to manipulate.

An object of this invention is to provide a unique arrangement of locating notches on a crankshaft which serve both as the means for supporting and rotating the crankshaft in the lathe and as means for loading and unloading the crankshaft in the chucking devices.

Another object is to prepare a crankshaft, for loading and unloading in a lathe, with a series of axially spaced locating notches in the rough webs of the crankshaft, the notches being radially positioned relative to the axis of the crankshaft so as to define unobstructed angularly related planes substantially parallel to said axis. The notches are arranged as guides upon which the crankshaft may be slid axially into or out of the chucking devices of the lathe.

Further features and advantages of this invention will appear in the following detailed description of the drawings in which—

Figure I is a perspective view of one side of a crankshaft with locating notches arranged for loading and unloading the crankshaft in a lathe.

Figure II is a perspective view of the other side of the crankshaft in Figure I showing a similar set of notches for loading and unloading the crankshaft in a lathe.

Figure III is an end view of the crankshaft looking from the stub end toward the flange end of the crankshaft.

The crankshaft here shown for illustrative purposes comprises the line bearings 27, 28 and 29; the flange end 30 and stub end 31; the crank pins 1, 2, 3, and 4; and the interconnecting webs 5, 6, 7, 8, 9, and 10. On one side of the crankshaft on the webs 5, 6, 9, and 10 are formed the locating notches 43, which are preferably arranged as shown in Figure III in planes parallel with the axis of rotation A of the crankshaft. Similarly, locating notches 44 are formed on the webs 6, 9, and 10, preferably diametrically opposite the notches 43. Noting Figure III it can be clearly seen that these notches form unobstructed grooves upon which may slide axially on a suitable loading and unloading rail into or out of a chucking device of a lathe.

These same locating notches also provide the sole means for supporting and rotating the chankshaft in the lathe when turning the line bearings and associated portions of the shaft. Usually the notches on the webs 6 and 9 are sufficient for this purpose.

The notches are also available for indexing and driving the crankshaft when chucking in an orbital lathe for the turning of the crank pins. In this instance the notches 43 on the webs 5 and 10 are utilized.

Having set forth and described our invention what we claim as new and desire to secure by United States Letters Patent is:

1. A crankshaft blank prepared for loading and unloading in a machine tool, said crankshaft blank having notches formed on axially spaced webs of said crankshaft blank so as to form a plurality of aligned and unobstructed grooves extending in a straight line axially the entire length of said crankshaft blank upon which said crankshaft blank may be axially slid in and out of a chucking device of said machine tool.

2. A crankshaft blank prepared for loading and unloading in a machine tool, said shaft having notches formed on its webs so as to form a plurality of aligned and unobstructed grooves extending in a straight line axially the entire length of the crankshaft blank upon which said crankshaft blank may be axially slid in and out of a chucking device of said machine tool.

3. A crankshaft blank prepared for loading and chucking in a machine tool, said crankshaft blank having loading and chucking notches formed on axially spaced webs so as to form a plurality of aligned and unobstructed grooves extending in a straight line axially the entire length of the crankshaft blank upon which said crankshaft blank may be slid axially in and out of a chucking device and for gripping said crankshaft blank by said chucking device.

WILLIAM F. GROENE.
WALTER R. MEYER.